United States Patent
Victor et al.

(10) Patent No.: US 9,722,814 B2
(45) Date of Patent: Aug. 1, 2017

(54) TECHNIQUES FOR ROUTING FROM AN ENDPOINT WITH SIMULTANEOUS ASSOCIATIONS TO MULTIPLE NETWORKS

(71) Applicant: SILVER SPRING NETWORKS, INC., Redwood City, CA (US)

(72) Inventors: Dalton Victor, San Jose, CA (US); Elad Gottlib, San Ramon, CA (US); George H. Flammer, III, Cupertino, CA (US)

(73) Assignee: Silver Springs Networks, Inc., San Jose, CA (US)

( * ) Notice: Subject to any disclaimer, the term of this patent is extended or adjusted under 35 U.S.C. 154(b) by 560 days.

(21) Appl. No.: 14/271,035

(22) Filed: May 6, 2014

(65) Prior Publication Data
US 2015/0029954 A1    Jan. 29, 2015

Related U.S. Application Data

(60) Provisional application No. 61/819,732, filed on Jul. 26, 2013.

(51) Int. Cl.
*H04L 12/54* (2013.01)
*H04W 40/12* (2009.01)

(52) U.S. Cl.
CPC ......... *H04L 12/5692* (2013.01); *H04W 40/12* (2013.01)

(58) Field of Classification Search
CPC ...... G06F 9/5027; G06F 15/16; G06F 15/173; H04W 40/12; H04W 48/18
See application file for complete search history.

(56) References Cited

U.S. PATENT DOCUMENTS

2011/0225276 A1* 9/2011 Hamilton, II ......... G06F 9/5027
709/223

* cited by examiner

*Primary Examiner* — Andrew Lai
*Assistant Examiner* — Leon Andrews
(74) *Attorney, Agent, or Firm* — Artegis Law Group, LLP

(57) ABSTRACT

A node within a wireless endpoint device may be coupled to multiple heterogeneous networks simultaneously. The node is configured to select between the different networks based on various constraints associated with the endpoint device, applications executing on the endpoint device, traffic routed by the endpoint device, and constraints associated with the multiple networks. Based on these different constraints, and based on the current operating mode of the node, the node rates each network, and then selects the network with the highest rating to be used for routing purposes.

21 Claims, 17 Drawing Sheets

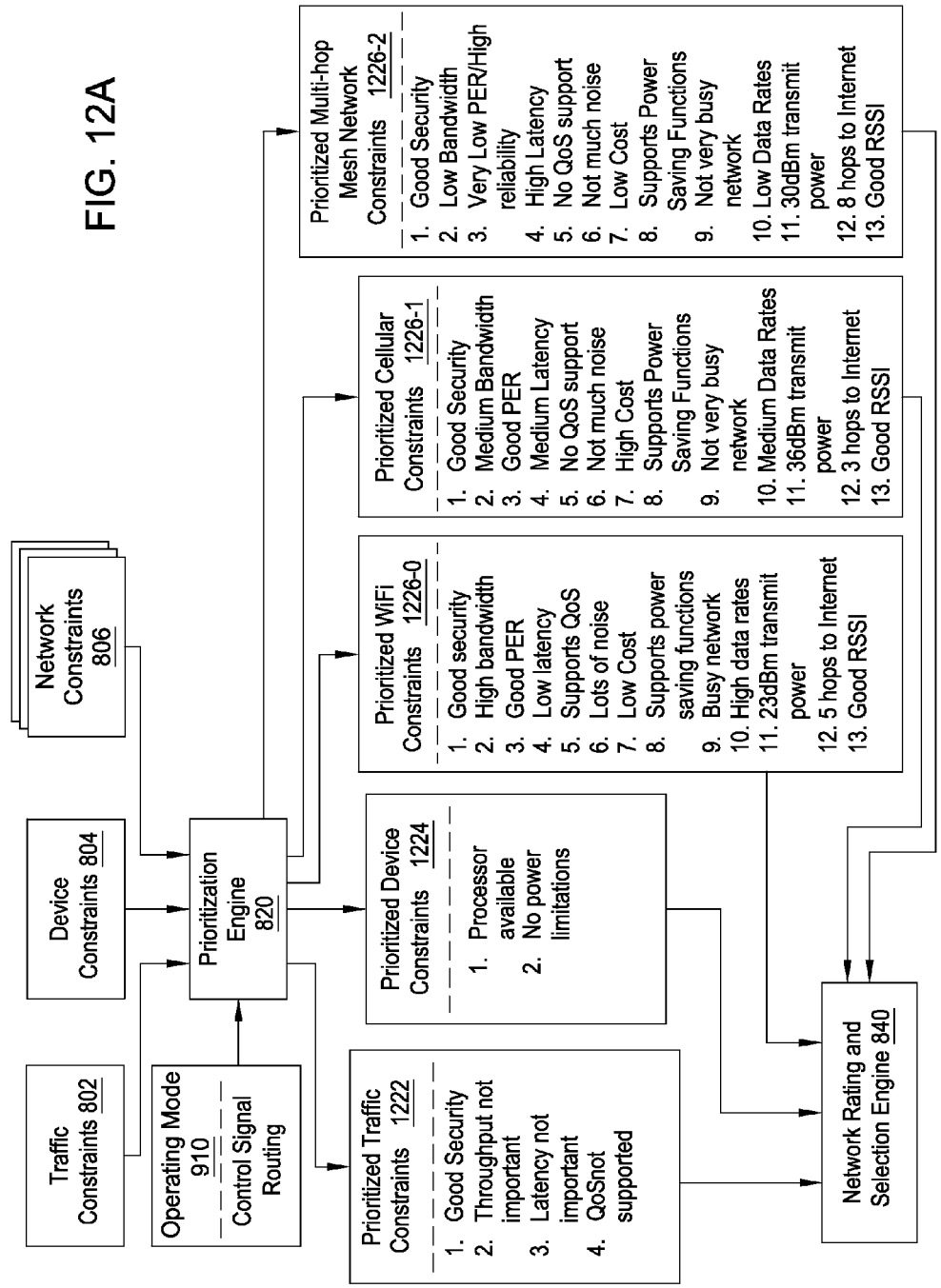

TECHNIQUES FOR ROUTING FROM AN ENDPOINT WITH SIMULTANEOUS ASSOCIATIONS TO MULTIPLE NETWORKS

CROSS-REFERENCE TO RELATED APPLICATIONS

This application claims the benefit of U.S. provisional patent application titled "Method for Routing from an Endpoint with Simultaneous Associations to Multiple Networks," filed on May 6, 2013 and having Ser. No. 61/819,732, which is hereby incorporated herein by reference.

BACKGROUND OF THE INVENTION

Field of the Invention

Embodiments of the present invention relate generally to wireless network communications and, more specifically, to techniques for routing from an endpoint with simultaneous associations to multiple networks.

Description of the Related Art

A conventional wireless endpoint device may be associated with many different types of networks simultaneously. For example, a modern smartphone typically includes a cellular transceiver capable of joining a cell network, as well as a WiFi™ transceiver capable of joining a WiFi™ network. Oftentimes the various different networks to which the endpoint device may be associated provide common functionality. In the above example, both the cell network and the WiFi™ network would allow the endpoint device to access the World Wide Web.

When coupled to multiple networks that provide common functionality, conventional endpoint devices oftentimes employ a rudimentary heuristic to determine which network to rely upon for specific tasks. Returning to the smartphone example, a commonly used heuristic dictates that the smartphone should always access the World Wide Web via the WiFi™ connection as opposed to the cellular connection. This exemplary heuristic is meant to prioritize usage of the WiFi™ network over that of the cellular network, because WiFi™ communication speeds are often faster compared to cellular communication speeds.

One drawback of conventional heuristics for selecting between networks is that modern networks often provide varying levels of connectivity, and so prioritizing one network over another network can lead to connectivity issues when the prioritized network provides limited connectivity. In the example of WiFi™ vs. cellular connectivity, wide-range WiFi™ networks now exist that are designed to support many endpoint devices occupying a large geographical area, such as a shopping district or entire city. Such wide-range WiFi™ networks usually sacrifice communication speeds for increased area of coverage and number of users, thereby providing a large number of users with limited network access. An endpoint device configured to implement the exemplary heuristic described above would prioritize this wide-range WiFi™ network over a cellular network, despite the fact that the cellular network may actually provide better connectivity.

As a general matter, conventional endpoint devices often employ heuristics for selecting between networks that, in certain cases, may actually limit the communication abilities of the endpoint device.

As the foregoing illustrates, what is needed in the art is a more effective approach for selecting between multiple wireless networks to which an endpoint device may be coupled.

SUMMARY OF THE INVENTION

One embodiment of the present invention sets forth a computer-implemented method for selecting between heterogeneous networks, including acquiring a set of constraints associated with a network node, determining a current operating mode associated with the network node, prioritizing the set of constraints based on the current operating mode to generate a set of prioritized constraints, generating a first rating for a first network to which the network node is coupled based on the set of prioritized constraints, generating a second rating for a second network to which the network node is coupled based on the set of prioritized constraints, determining that the first rating exceeds the second rating, and causing the network node to transmit or receive data on the first network.

One advantage of the techniques set forth herein is that the endpoint device may select the optimal network on which to perform communications based on a wider range of environmental and operational factors compared to traditional approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 12A-12B illustrate exemplary data and processing engines implemented by the node of FIG. 3 when selecting between a WiFi™ network, a cellular network, and a multi-hop mesh network according to a high-reliability operating mode, according to one embodiment of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
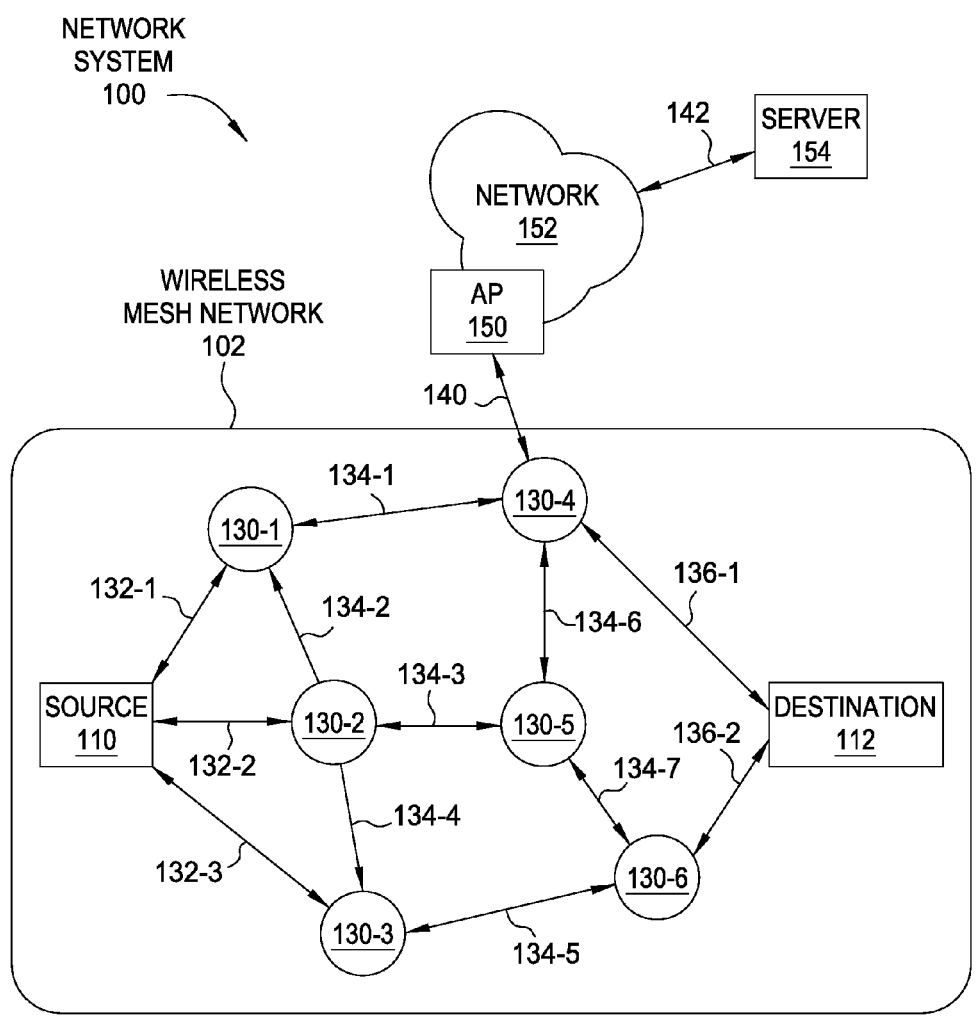
FIG. 1 illustrates a network system configured to implement one or more aspects of the invention.

FIG. 1 illustrates a network system 100 configured to implement one or more aspects of the invention. As shown, the network system 100 includes a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing from the scope and spirit of embodiments of the present invention.

The discovery protocol may also be implemented to determine the hopping sequences of adjacent nodes, i.e. the sequence of channels across which nodes periodically receive payload data. As is known in the art, a "channel" may correspond to a particular range of frequencies. Once adjacency is established between the source node 110 and at least one intermediate node 130, the source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112.

For example, the payload data may include a header field configured to include a destination address, such as an IP address or Ethernet media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address, and each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

In network system 100, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 is coupled to the server 154 via communications link 142. The access point 150 is coupled to the network 152, which may comprise any wired, optical, wireless, or hybrid network configured to transmit payload data between the access point 150 and the server 154.

In one embodiment, the server 154 represents a destination for payload data originating within the wireless mesh network 102 and a source of payload data destined for one or more nodes within the wireless mesh network 102. In one embodiment, the server 154 executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting.

The techniques described herein are sufficiently flexible to be utilized within any technically feasible network environment including, without limitation, a wide-area network (WAN) or a local-area network (LAN). Moreover, multiple network types may exist within a given network system 100. For example, communications between two nodes 130 or between a node 130 and the corresponding access point 150 may be via a radio-frequency local-area network (RF LAN), while communications between access points 150 and the network may be via a WAN such as a general packet radio service (GPRS). As mentioned above, each node within wireless mesh network 102 includes a network interface that enables the node to communicate wirelessly with other nodes. Each node 130 may implement the first and/or second embodiments of the invention, as described above, by operation of the network interface. An exemplary network interface is described below in conjunction with FIG. 2.

Figure 2:
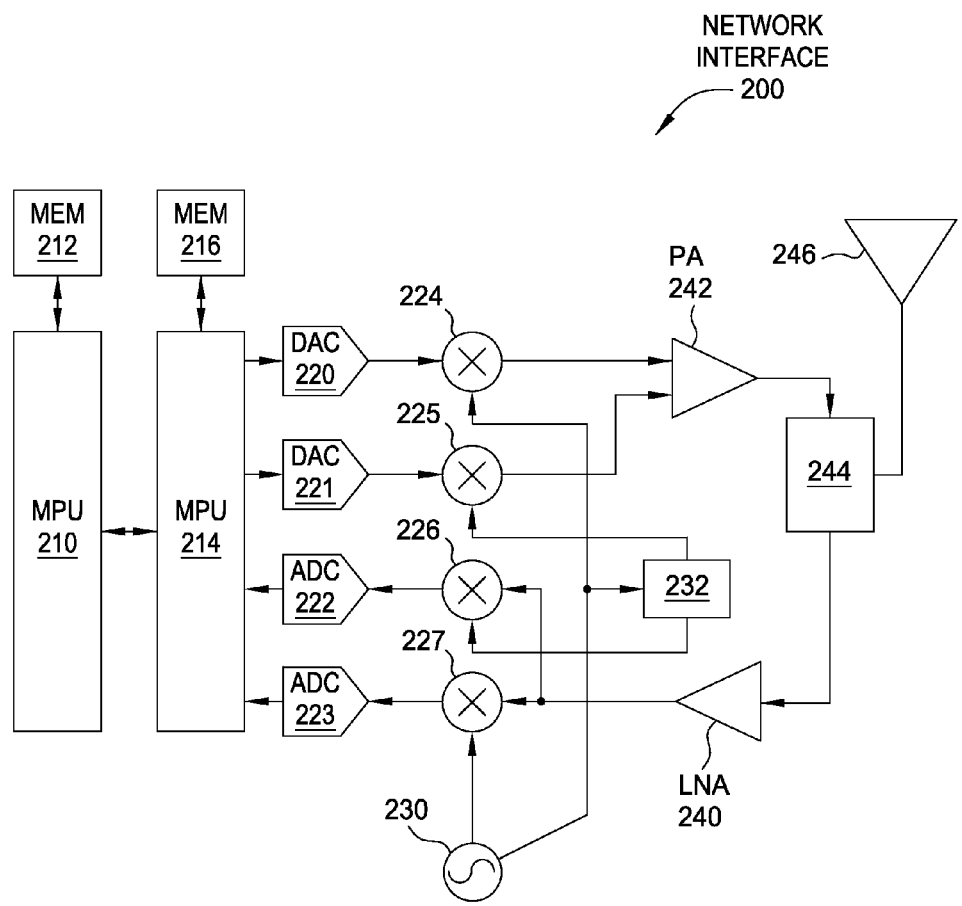
FIG. 2 illustrates a network interface configured to transmit and receive data within a mesh network, according to one embodiment of the invention.

FIG. 2 illustrates a network interface 200 configured to implement multi-channel operation, according to one embodiment of the invention. Each node 110, 112, 130 within the wireless mesh network 102 of FIG. 1 includes at least one instance of the network interface 200. The network interface 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage. Memory 212 and/or memory 216 may be used to store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node, as described in conjunction with FIGS. 1 and 3-12B, when MPU 210 executes a firmware program stored in memory within network interface 200.

The MPU 214 is coupled to DAC 220 and DAC 221. Each DAC 220, 221 is configured to convert a stream of outbound digital values into a corresponding analog signal. The outbound digital values are computed by the signal processing procedures for modulating one or more channels. The MPU 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values. Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Referring generally to FIGS. 1-2, a given node 130 may be incorporated into a wide variety of different types of endpoint devices, including cellular phones, smartphones, tablet computers, laptop computers, desktop computers, base stations, routers, smart television sets, power distribution meters, smart meters, and other mobile or stationary devices configured to transmit and receive data across networks. In addition, a given node 130 may be coupled to many different types of networks simultaneously, including, but not limited to, wireless mesh network 102, a cellular network, a WiFi™ network, a Bluetooth network, and any other technically feasible wired or wireless network.

A node 130 is configured to select between the different networks to which that node is coupled and to then transmit and/or receive data on the selected network. The node 130 selects a particular network based on different sets of constraints. One set of constraints includes traffic constraints that reflect traffic-oriented needs of applications executing on the endpoint device. Another set of constraints includes device constraints associated with the endpoint device or the node 130 within that device. A third set of constraints includes network constraints associated with each of the various networks to which the node 130 may be coupled. The node 130 is configured to prioritize the different sets of constraints based on a current operating mode of the node 130. The operating mode generally reflects current operating conditions associated with the node 130, such as, e.g., a low power mode that reflects a low battery of the device, a high-reliability mode triggered by a particular type of traffic, a low-latency mode associated with a specific application, and so forth. Upon prioritizing the various sets of constraints, the node 130 then rates the different networks based on those prioritized constraints. The node 130 may then select a network on which to transmit and receive data based on the network ratings. This general approach is described in greater detail below in conjunction with FIGS. 3-12B.

Selecting Between Heterogeneous Networks

Figure 3:
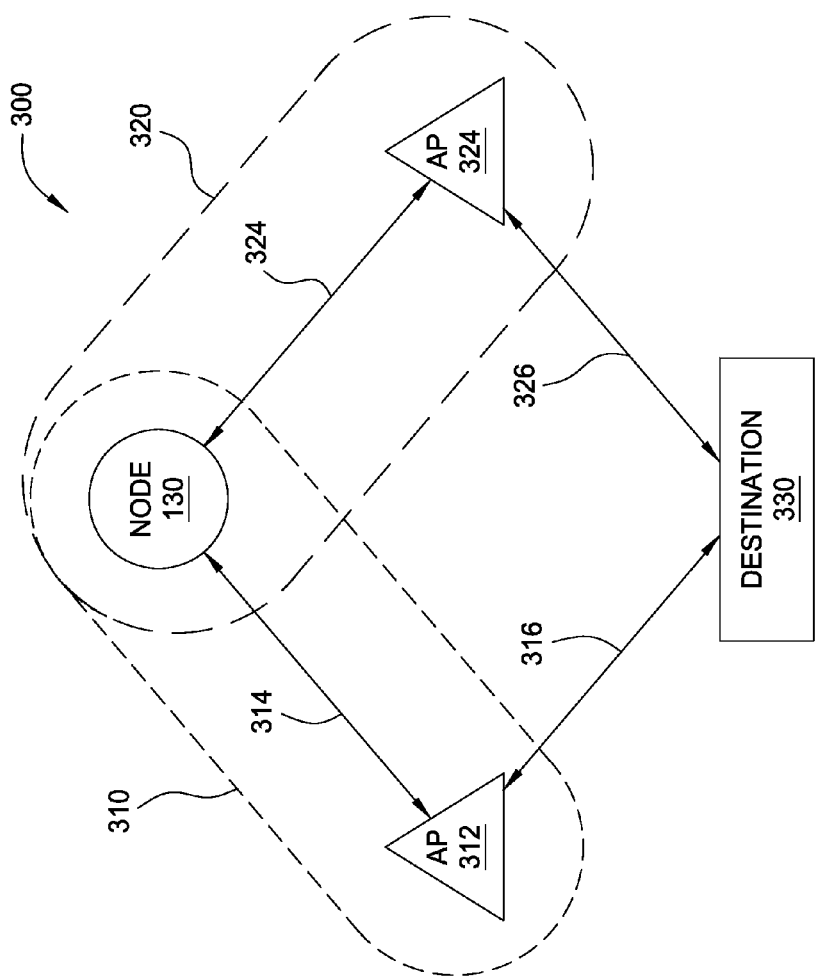
FIG. 3 illustrates a node within the network system of FIG. 1 coupled to multiple heterogeneous networks, according to one embodiment of the present invention.

FIG. 3 illustrates a node within the network system of FIG. 1 coupled to multiple heterogeneous networks, according to one embodiment of the present invention. As shown, node 130 is coupled to a network 310 that includes an access point (AP) 312. Node 130 is configured to join network 310 by establishing communication link 314 with AP 312. AP 312 is configured to establish a communication link 316 with a destination 330, thereby providing node 130 with a pathway to destination 330 via communication links 314 and 316. Destination 330 may be included within network 310.

As also shown, node 130 is coupled to a network 320 that includes an AP 322. Node 130 is configured to join network 320 by establishing communication link 324 with AP 322. AP 322 is configured to establish a communication link 326 with destination 330, thereby providing node 130 with a pathway to destination 330 via communication links 324 and 326. Destination 330 may also be included within network 320.

Each of networks 310 and 320 may be any technically feasible type of network, including, for example, a wireless mesh network, a cellular network, a WiFi™ network, a Bluetooth network, and so forth. Networks 310 and 320 may be the same type of network and thus provide access according to a common protocol. For example, networks 310 and 320 could both be WiFi™ networks. Alternatively, networks 310 and 320 may be different types of networks and provide access according to different protocols. For example, network 310 could be a WiFi™ network while network 320 could be a cellular network.

Destination 330 represents a generic remote unit or collection of units with which node 130 is configured to establish communications. For example, destination 330 could be a remote server to which node 130 transmits and/or receives data. In another example, destination 330 could be an internet protocol (IP) network that node 130 relies upon for accessing data, the Internet, or other devices coupled to that network. In yet another example, destination 330 could be a second node 130 with which node 130 is configured to communicate.

Node 130 is configured to establish communications with destination 330 and to then route traffic to and from that destination. In doing so, node 130 is configured to select between networks 310 and 320 and then route traffic to and/or from destination 330 across the selected network. In one embodiment, node 130 may select between networks 310 and 320 for data transmission purposes, and then separately select between networks 310 and 320 for data reception purposes. In another embodiment, node 130 may select between networks 310 and 320 separately for each different type of traffic node 130 is configured to route, e.g. when operating in a multi-network mode of operation.

As mentioned above, node 130 is configured to select between networks 310 and 320 based on various sets of constraints associated with applications that execute on node 130 (or on an endpoint device that includes node 130) and/or traffic associated with those applications, constraints associated with the endpoint device within which node 130 resides, and constraints associated with networks 310 and 320.

The set of traffic constraints according to which node 130 selects a network could include, for example, a maximum hop count, a ratio of QoS to speed, a maximum latency value, a maximum timing jitter value, a link quality indicator, a maximum number of retries, a minimum data rate, a maximum packet error rate, a received signal strength indicator (RSSI), a signal to noise ration (SNR), a minimum channel bandwidth, an optimal duty cycle, a load balancing objective, a need to bridge traffic between multiple networks, and so forth. The set of device constraints could include, for example, a maximum rate of power consumption, a maximum transmit power, a roaming area, and so forth. The set of network constraints could include, for example, a power usage rate of the network, a power saving technique associated with the network protocol, a cost per byte associated with the network, security features of the network, and so forth.

Figure 4:
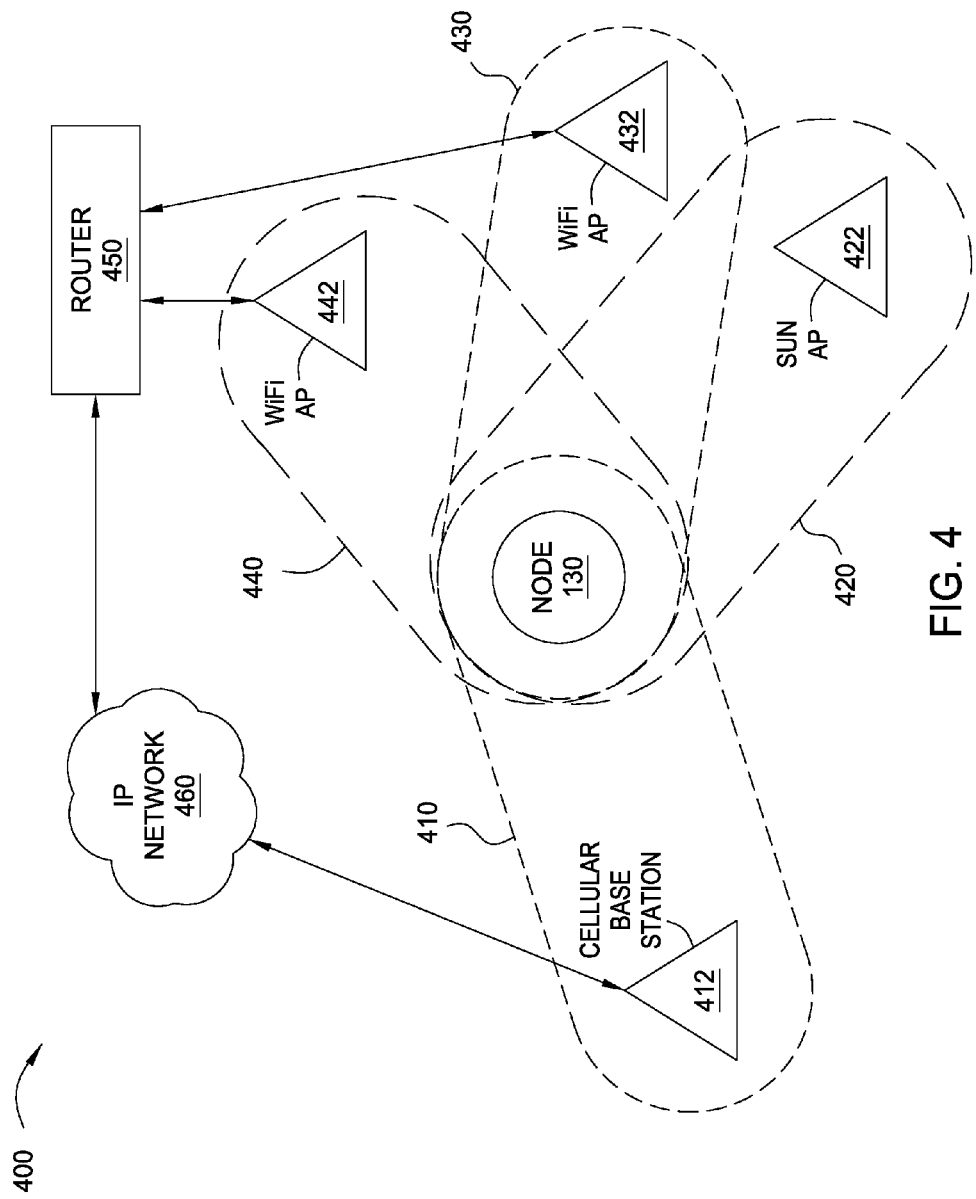
FIG. 4 illustrates an exemplary scenario where the node of FIG. 3 selects between heterogeneous networks based on performance metrics associated with each network, according to one embodiment of the present invention.
Figure 5:
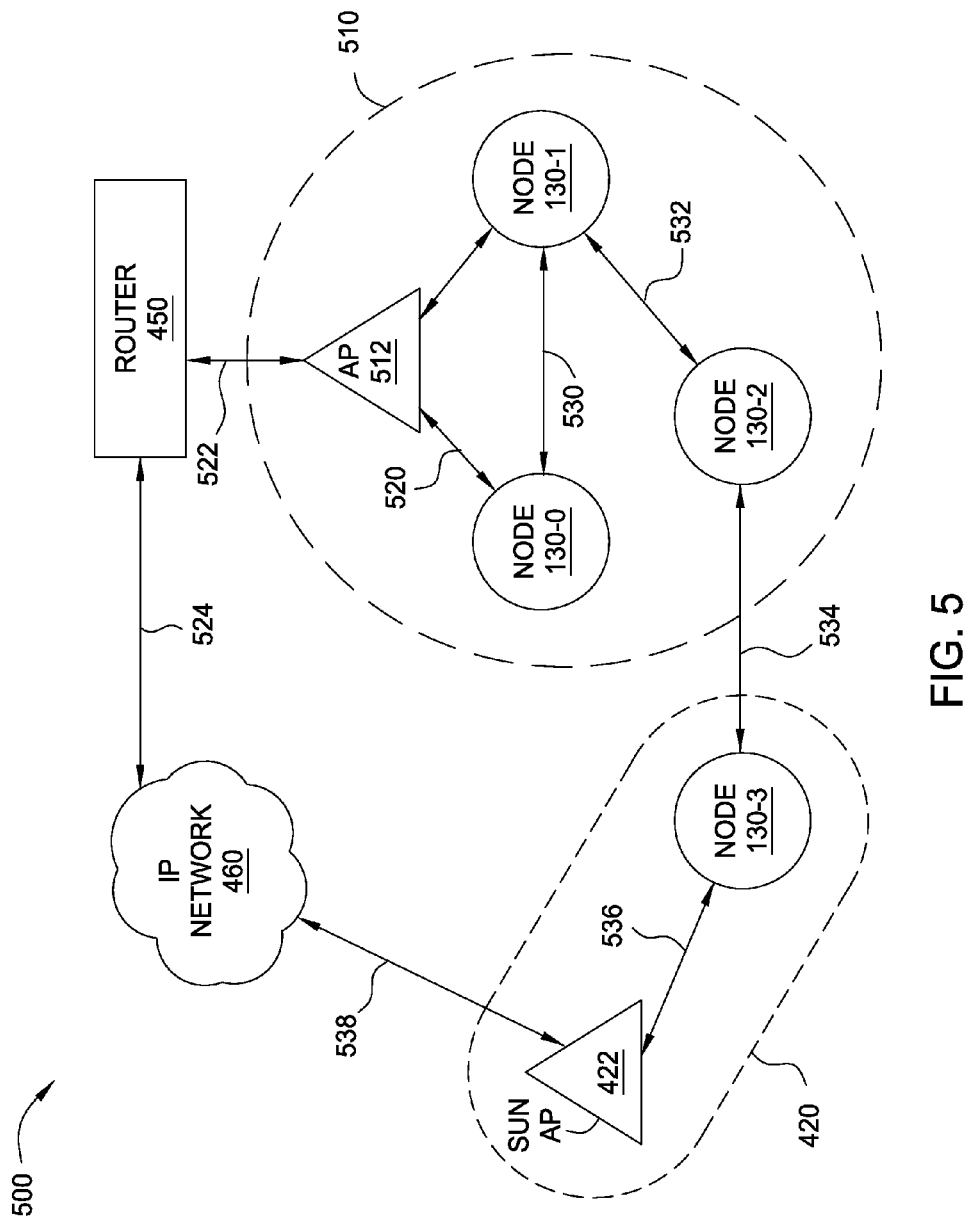
FIG. 5 illustrates an exemplary scenario where the node of FIG. 3 selects between heterogeneous networks based on a hop count associated with each network, according to one embodiment of the present invention.
Figure 6:
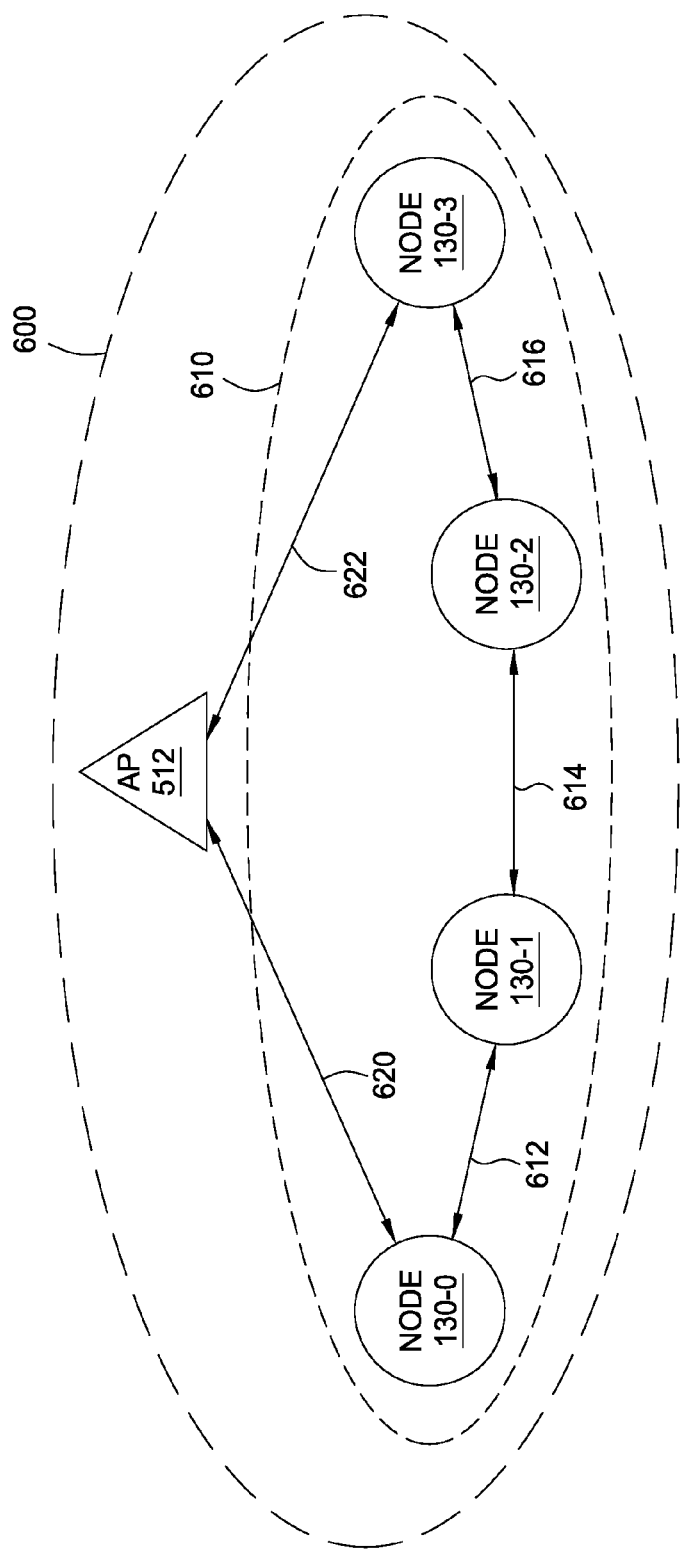
FIG. 6 illustrates an exemplary scenario where the node of FIG. 3 selects between heterogeneous networks based on timing constraints associated with transmitting data across each network, according to one embodiment of the present invention.

Node 130 is configured to collect the aforementioned sets of constraints and then prioritize those constraints based on the current operating mode associated with node 130. For example, node 130 could determine that the endpoint device that includes node 130 is currently operating with a low battery, and then prioritized power constraints over other constraints. Node 130 then computes a rating for each of networks 310 and 320 based on the prioritized constraints. Node 130 could, for example, compute a rating for network 310 by assigning a value to each constraint that reflects the degree to which network 310 meets that constraint, and then weight each value based on the prioritization level. Node 130 could then accumulate the weighted values to compute the rating for network 310. Once node 130 has computed a rating for each of networks 310 and 320, node 130 then selects between those networks, based on the computed ratings, and routes traffic on the selected network. FIGS. 4-6 illustrate exemplary heterogeneous networks in which the approach described thus far may be practiced, as described in greater detail below.

FIG. 4 illustrates an exemplary scenario where node 130 of FIG. 3 selects between heterogeneous networks based on performance metrics associated with each network, according to one embodiment of the present invention. In the following exemplary scenario, node 130 operates according to a high-throughput mode, which could, for example, be triggered by an application attempting to stream video data, among other possibilities.

As shown, node 130 resides within a multi-network system 400 that includes a cellular network 410, a smart utility network (SUN) 420, WiFi™ networks 430 and 440, a router 450, and an IP network 460. Cellular network 410 includes a cellular base station 412 configured to establish and maintain cellular network 410. Node 130 may join cellular network 410 by establishing a communication link (not shown) with cellular base station 412. SUN 420 includes a SUN AP 422 configured to establish and maintain SUN 420. Node 130 may join SUN 420 by establishing a communication link (not shown) with SUN AP 422. WiFi™ networks 430 and 440 include WiFi™ APs 432 and 442, respectively. Node 130 may join WiFi™ networks 430 and/or 440 by establishing a communication links (none shown) with the respective WiFi™ APs 432 and 442. In one embodiment, each of WiFi™ APs 432 and 442 provide multiple basic service sets (BSSs) associated with different channels or different bands. WiFi™ APs 432 and 442 are configured to establish communication links with a router 450 that provides access to IP network 460.

IP network 460 represents an example of destination 330 shown in FIG. 3. Node 130 is configured to access IP network 460 via any of the networks to which node 130 is coupled. IP network 460 may be the Internet or the World Wide Web, among other possibilities. Node 130 is configured to select between networks 410, 420, 430, and 440 by implementing the general process described above in conjunction with FIG. 3.

In the specific context of FIG. 4, node 130 acquires traffic constraints associated with the video data that node 130 is configured to route, device constraints associated with an endpoint device that includes node 130, and network constraints associated with each of networks 410, 420, 430, and 440. Node 130 then prioritizes these different sets of constraints to reflect the high-throughput mode according to which node 130 currently operates. Node 130 then rates each of networks 410, 420, 430, and 440 based on the prioritized sets of constraints. In the example shown, node 130 could determine that network 430 has the highest rating, indicating that network 430 best meets the prioritized sets of constraints. In particular, network 430 could provide the best performance for transporting video data. Upon selecting network 430, node 130 is configured to route the video data across that network.

FIG. 5 illustrates another exemplary scenario where the node of FIG. 3 selects between heterogeneous networks based on a hop count associated with each network, according to one embodiment of the present invention. In the following exemplary scenario, a node 130-0 operates according to a traffic reduction mode, which could, for example, be triggered upon detecting that the various networks to which node 130-0 is coupled are experiencing heavy traffic congestion.

As shown, node 130-0 resides within a multi-network system 500 that includes a mesh network 510 coupled to SUN 420 and router 450 of FIG. 4. Mesh network 510 includes an AP 512 as well as nodes 130-0 through 130-2. Nodes 130-0 through 130-2 are interconnected with one another by various communication links, forming a mesh. Node 130-0 is configured to join mesh network 510 by establishing communication link 520 with AP 512 as well as communication link 530 with node 130-1. Node 130-0 may then access IP network 460 across communication links 520, 522, and 524 (3 hops). As also shown, SUN 420 includes a node 130-4 that is configured to join SUN 420 by establishing communication link 536 with SUN AP 422. Since node 130-0 is linked to node 130-4 by intermediate nodes 130-1 and 130-2, node 130-0 may access IP network across communication links 530, 532, 534, 536, and 538 (5 hops).

As mentioned above, in the exemplary scenario discussed herein node 130-0 is configured to determine that mesh network 510 and SUN 420 are congested with heavy traffic. In response, node 130-0 enters a traffic reduction mode. When selecting a network across which to route traffic, node 130 acquires traffic constraints, device constraints, and network constraints in the fashion mentioned above, and then prioritizes those different sets of constraints according to the traffic reduction mode. In so doing, node 130-0 may prioritize a hop count constraint above other constraints to reflect the need to reduce network traffic. Node 130-0 then rates each network based on the prioritized constraints. Since mesh network 510 offers access to IP network 460 with a lower hop count (3 hops) compared to that of SUN 420 (5 hops), mesh network 510 better meets the various prioritized constraints, and, thus, node 130-0 selects mesh network 510 for routing purposes.

FIG. 6 illustrates an exemplary scenario where the node of FIG. 3 selects between heterogeneous networks based on timing constraints associated with transmitting data across each network, according to one embodiment of the present invention. In the following exemplary scenario, a node 130-0 operates according to a timing-sensitive mode, which could, for example, be triggered by an application attempting to stream latency or jitter-sensitive data, among other possibilities.

As shown, a basic service set (BSS) 600 includes AP 602 and nodes 130-0 through 130-3. Nodes 130-0 through 130-3 are interconnected with one another, forming a mesh 610. Node 130-0 is coupled to node 130-1 by communication link 612, node 130-1 is coupled to node 130-2 by communication link 614, and node 130-2 is coupled to node 130-3 by communication link 616. Nodes 130-0 and 130-3 are coupled to AP 602 by communication links 620 and 622, respectively, thereby allowing those nodes to communication with one another via AP 512.

In the exemplary scenario discussed herein, node 130-3 represents a target destination for node 130-0. Node 130-0 could be configured to transmit data to node 130-3 or receive data from node 130-3, among other examples. Node 130-0 may be configured to route traffic to and/or from node 130-3 via mesh 610 or via BSS 600. Node 130-0 is configured to select either BSS 600 or mesh 610 for routing purposes based on prioritized constraints, similar to above. Node 130-0 acquires traffic, device, and network constraints and then prioritizes those constraints according to the timing-sensitive operating mode of node 130-0. In particular, node 130-0 prioritizes latency and jitter constraints associated with BSS 600 and mesh 610 above other constraints, and then rates those networks based on the prioritized network constraints. In this example, mesh 610 provides lower jitter, despite requiring more hops from node 130-0 to node 130-3 compared to BSS 600. As such, node 130-0 selects mesh 610 and routes traffic to node 130-3 via communication links 612, 614, and 616.

Referring generally to FIGS. 3-6, node 130 is configured to operate within a wide variety of different types of networks with diverse architectures. Persons skilled in the art will recognize that the exemplary network architectures discussed thus far are provided for illustrative purposes only. In addition, node 130 may select between the various possible networks using a wide variety of different types of constraints, and may prioritize those constraints using any technically feasible approach to ranking elements in a set. As described in greater detail below, FIG. 7 illustrates a generic approach to selecting between networks, while FIGS. 8A-12B illustrate specific, exemplary implementations of that approach.

Figure 7:
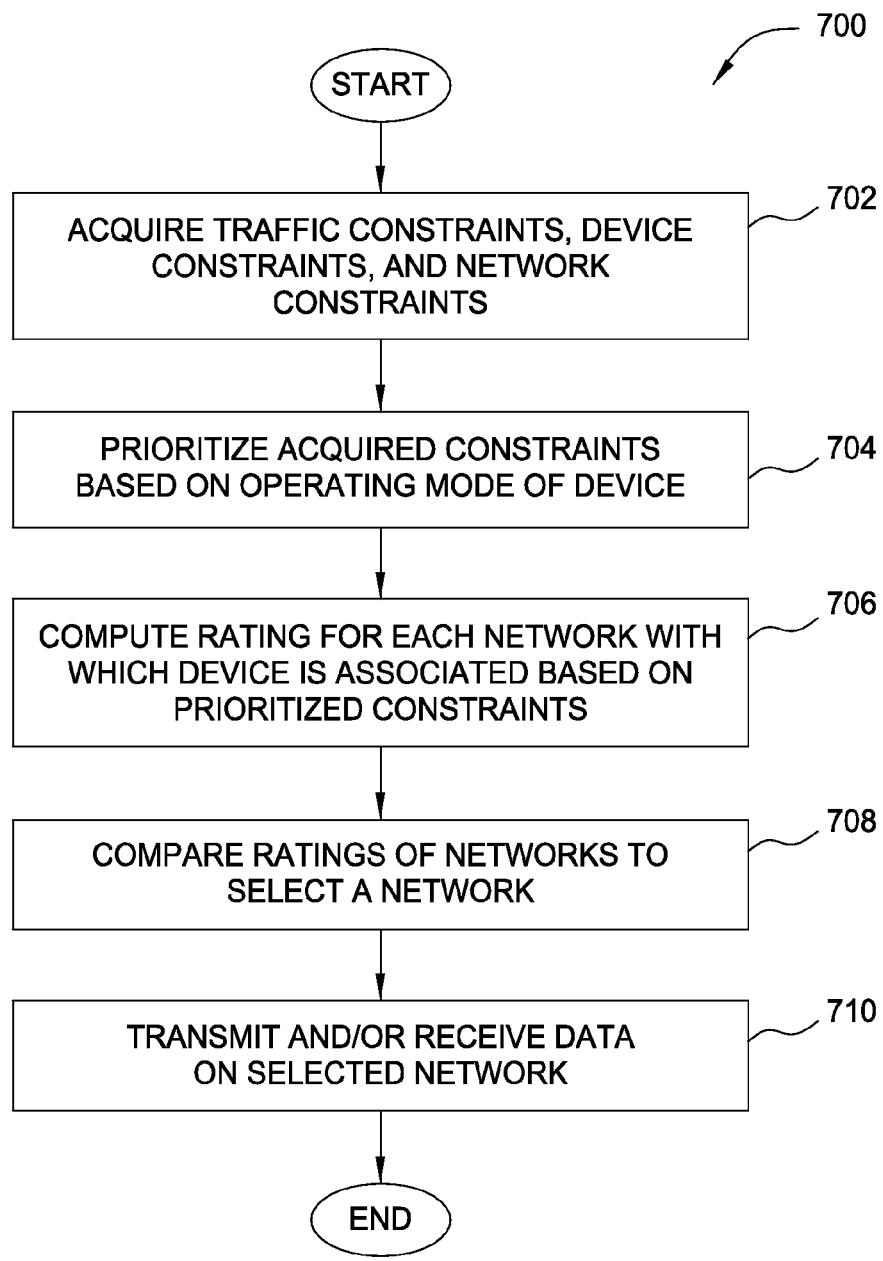
FIG. 7 is a flow diagram of method steps for selecting between different heterogeneous networks associated with a node, according to one embodiment of the present invention.

FIG. 7 is a flow diagram of method steps for selecting between different heterogeneous networks associated with a node, according to one embodiment of the present invention. Although the method steps are described in conjunction with the systems of FIGS. 1-6, persons skilled in the art will understand that any system configured to perform the method steps, in any order, is within the scope of the present invention.

As shown, a method 700 begins at step 702, where node 130 acquires traffic constraints, device constraints, and network constraints. The traffic constraints reflect limitations associated with traffic generated or consumed by an application executed by the endpoint device where node 130 resides, including, e.g. bandwidth needs or latency restrictions, etc. The device constraints reflect limitations associated with the endpoint device, including e.g. power restrictions, transmitter settings, etc. The network constraints reflect limitations associated with the various networks to which node 130 is coupled. When acquiring network constraints at step 702, node 130 acquire a different set of network constraints for each different network.

At step 704, node 130 prioritizes the different sets of constraints acquired at step 702 based on the current operating mode of node 130. The current operating mode of node 130 is derived from a set of conditions that influence the functionality of node 130, including application execution conditions, network traffic conditions, environmental conditions, and so forth. In one embodiment, node 130 maintains a different set of prioritizations for each operating mode. Upon entering a given operating mode, node 130 retrieves prioritized traffic constraints, prioritized device constraints, and prioritized network constraints associated with that operating mode. The prioritized network constraints includes a different set of prioritized network constraints for each different network to which node 130 is coupled.

At step 706, node 130 computes a rating for each network to which node 130 is coupled based on the prioritized constraints. The rating for a given network reflects the degree to which the given network allows node 130 to meet the prioritized network constraints associated with that network, as well as the prioritized traffic and device constraints. In one embodiment, node 130 generates a score for each set of constraints, and then combines the scores to generate the network rating. To generate the score for a given set of constraints, node 130 computes a value for each constraint that reflects the degree to which that constraint is met, and then weights the value based on the prioritization level of that constraint.

At step 708, node 130 compares the ratings for each network and determines which network has achieved the highest rating. At step 710, node 130 selects the highest rated network and then transmits and/or receives data on that network. The method 700 may be repeated periodically, or when triggered by certain events. For example, when node 130 changes locations or changes operating modes, the method 700 may be repeated. By implementing the approach described above, node 130 employs intelligent heuristics for selecting a network that reflect the real-time operating state of the node, the state of applications executing thereon, and the state of the networks to which node 130 is coupled.

Exemplary Scenarios of Selecting Between Heterogeneous Networks

Figure 8A:
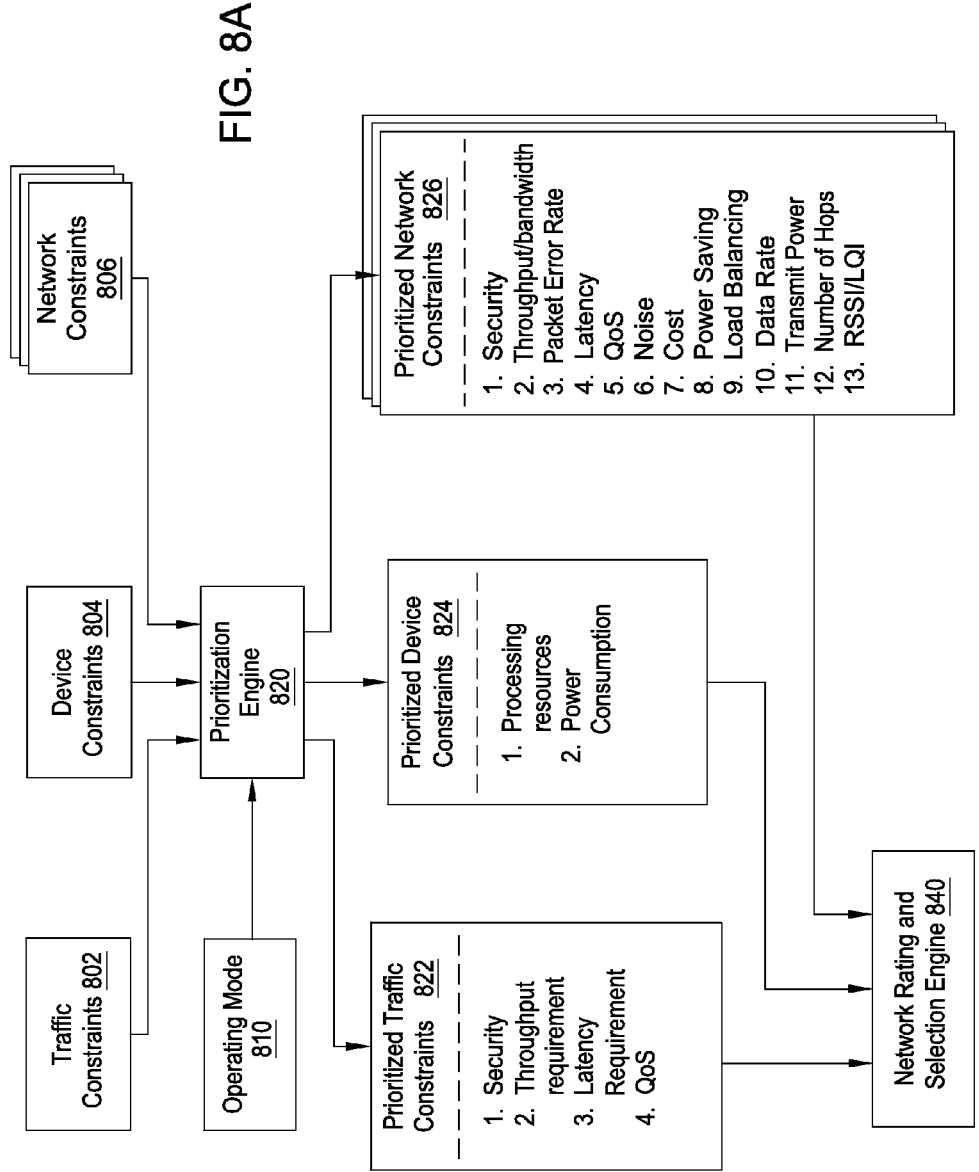
FIGS. 8A-8B illustrate data and processing engines implemented by the node of FIG. 3 when selecting between heterogeneous networks according to an operating mode of the node, according to one embodiment of the present invention.

The following FIGS. 8A-12B reflect exemplary use-cases where the techniques described thus far may be applied. FIGS. 8A-8B reflect a basic, generic use case, while FIGS. 9A-12B reflect more specific use cases.

Figure 8B:
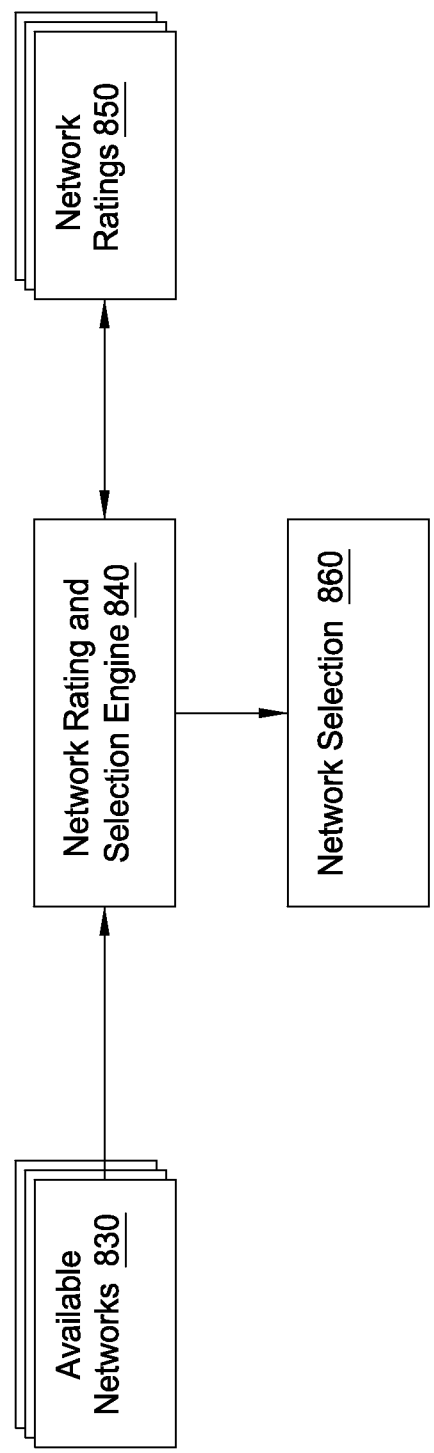

FIGS. 8A-8B illustrate data and processing engines implemented by the node of FIG. 3 when selecting between heterogeneous networks according to an operating state of the node, according to one embodiment of the present invention. In FIG. 8A, a prioritization engine 820 within node 130 acquires traffic constraints 802, device constraints 804, and network constraints 806. Network constraints 806 include a different set of constraints for each network to which node 130 is coupled. Prioritization engine 820 also receives operating state 810 of node 130. Operating mode 810 of node 130 is derived from the current operating conditions of node 130.

Based on operating mode 810, node 130 prioritizes traffic constraints 802, device constraints 804, and network constraints 806 to generate prioritized traffic constraints 822, prioritized device constraints 824, and prioritized network constrains 826, respectively. Prioritized network constraints 826 include a different set of prioritized constraints for each different network. The various prioritized constraints shown in FIG. 8A reflect default prioritizations for the respective constraints. Network selection and rating engine 840 then receives the various prioritized constraints.

In FIG. 8B, network selection and rating engine 840 computes network ratings 850 that include a different rating for each different network. By comparing the different network ratings, network selection and rating engine 840 selects between available networks 830 to generate network selection 860. Node 130 may than route traffic across the selected network.

Node 130 is configured to adjust the default prioritizations shown in FIG. 8A based on different operating modes of node 130, as described in greater detail below in conjunction with FIGS. 9A-12B.

Figure 9A:
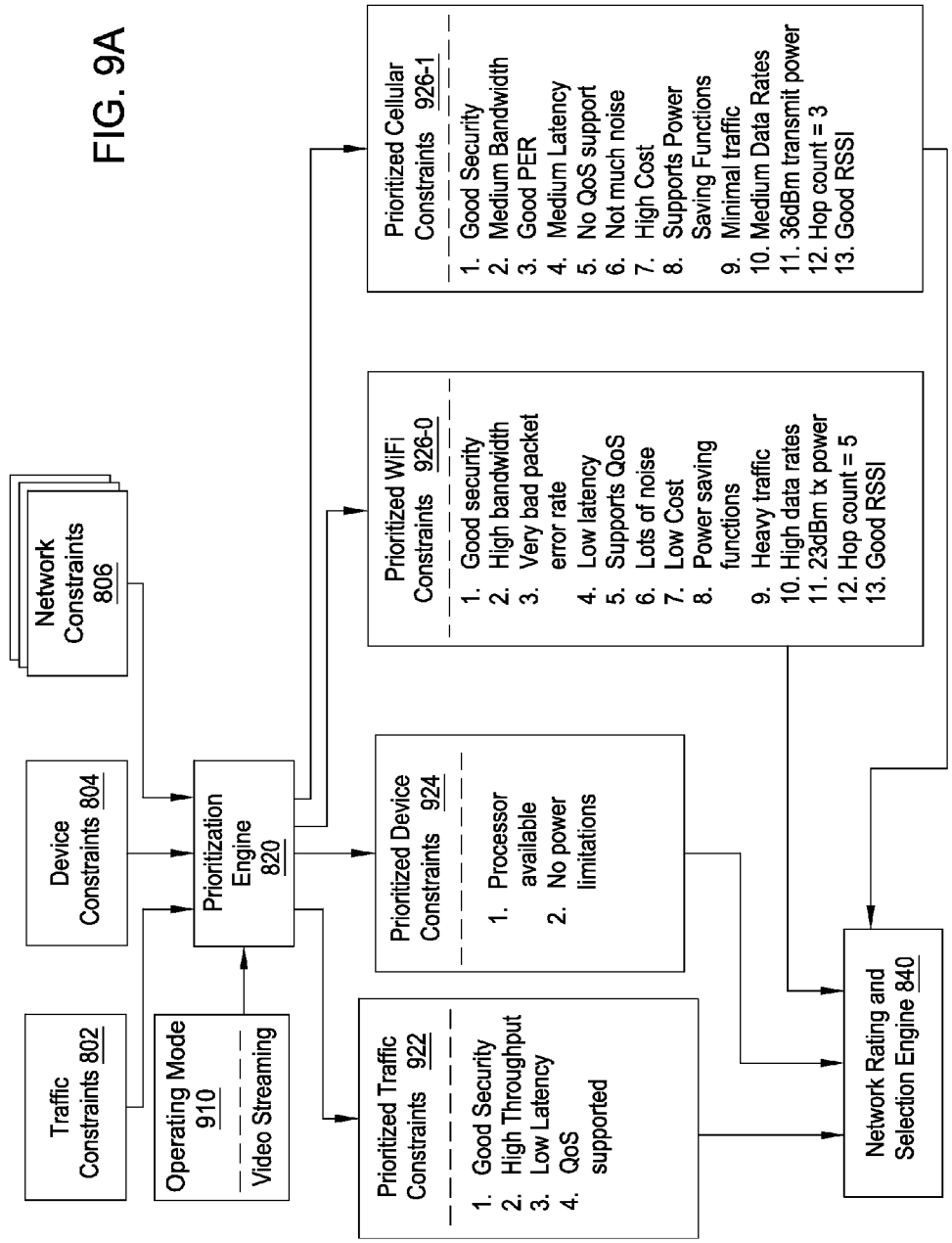
FIGS. 9A-9B illustrate exemplary data and processing engines implemented by the node of FIG. 3 when selecting between a WiFi™ network and a cellular network according to a high-throughput operating mode, according to one embodiment of the present invention.
Figure 9B:
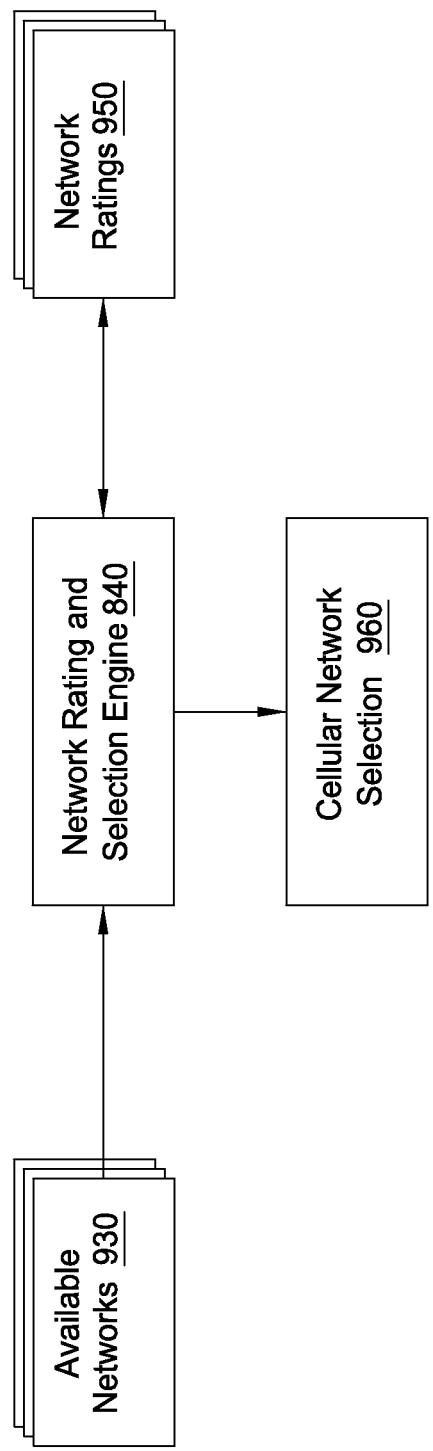

FIGS. 9A-9B illustrate exemplary data and processing engines implemented by the node of FIG. 3 when selecting between a WiFi™ network and a cellular network according to a high-throughput operating mode, according to one embodiment of the present invention. In FIG. 9A, prioritization engine 820 acquires traffic constraints 802, device constraints 804, and network constraints 806, similar to FIG. 8A. Prioritization engine 820 also receives operating mode 910 of node 130, which indicates that node 130 operates in a high-throughput mode to support video streaming.

Based on operating mode 910, node 130 prioritizes traffic constraints 802 and device constraints 804 to generate prioritized traffic constraints 922 and prioritized device constraints 924, respectively. Prioritization engine 820 also prioritizes different network constraints 806 associated with a WiFi™ network and a cellular network to which node 130 is coupled to generate prioritized WiFi™ constraints 926-0 and prioritized cellular constraints 926-1, respectively. Network selection and rating engine 840 then receives the various prioritized constraints.

In FIG. 9B, network selection and rating engine 840 computes different network ratings 950 for the WiFi™ network and the cellular network. By comparing the different network ratings, network selection and rating engine 840 determines that the cellular network is rated higher than the WiFi™ network, indicating that the cellular network may support operating mode 910 more effectively than the WiFi™ network. Node 130 may than route traffic across the cellular network.

In one embodiment, node 130 implements a decision process whereby node 130 compares corresponding constraints associated with the WiFi™ network and the cellular network. In doing so, node 130 first determines that both networks provide good security (first priority). Node 130 then determines that the WiFi™ provides higher bandwidth (second priority) than the cellular network, thereby favoring the WiFi™ network. However, node 130 then determines that the WiFi™ network is experiencing a much higher error rate than the cellular network (third priority), thereby disqualifying the WiFi™ network from consideration. Node 130 therefore selects the cellular network.

Figure 10A:
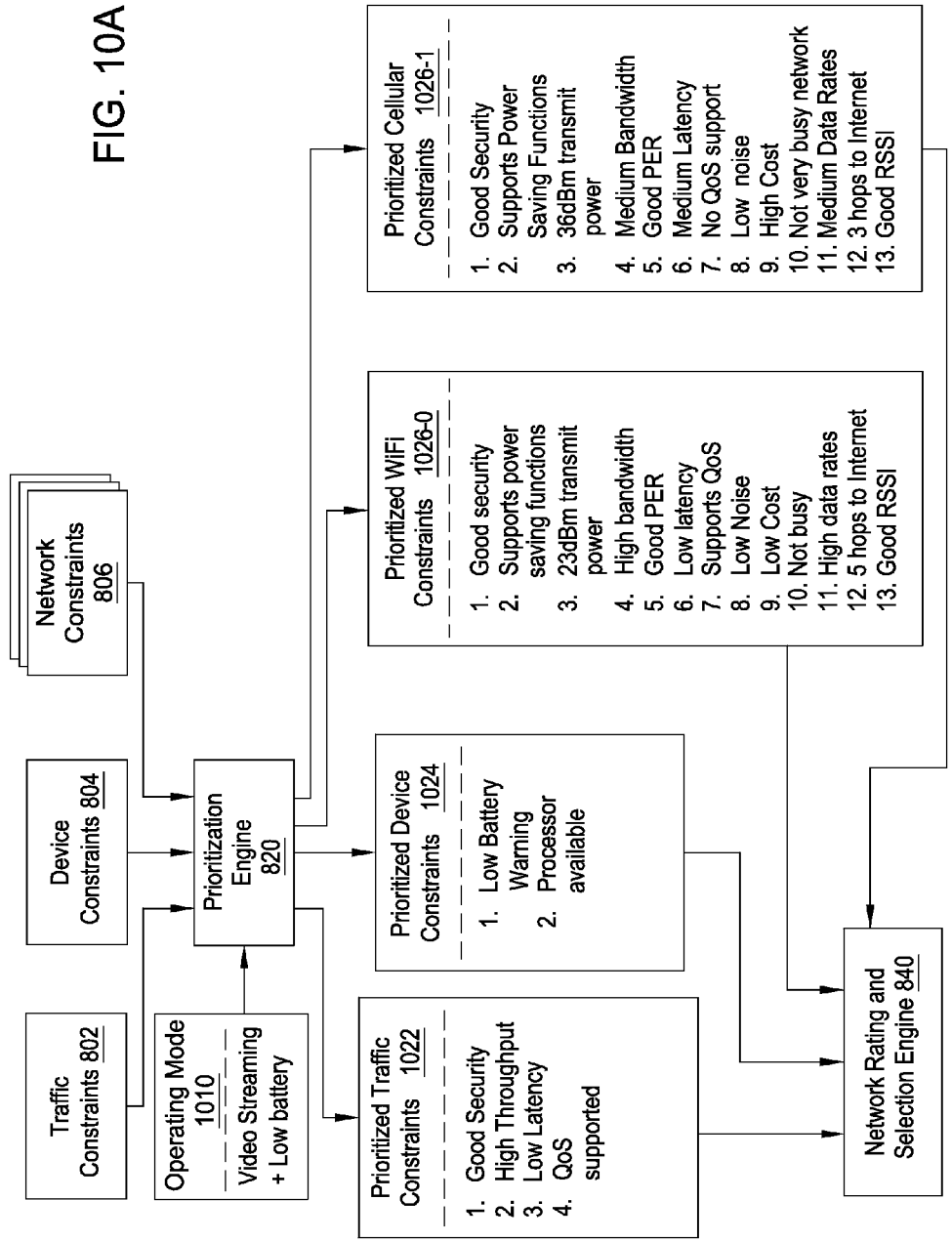
FIGS. 10A-10B illustrate exemplary data and processing engines implemented by the node of FIG. 3 when selecting between a WiFi™ network and a cellular network according to a low-battery operating mode, according to one embodiment of the present invention.
Figure 10B:
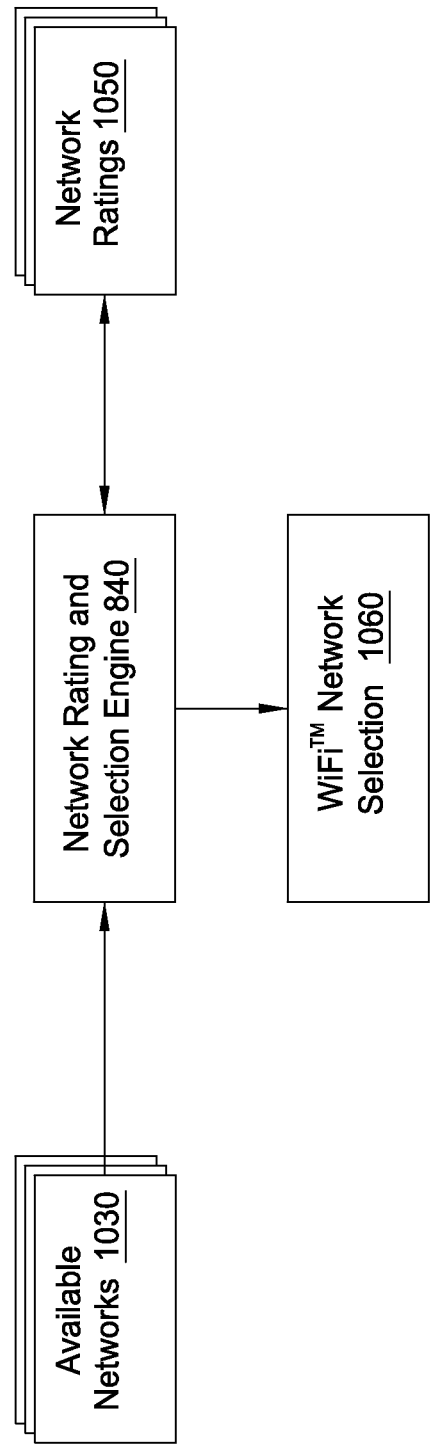

FIGS. 10A-10B illustrate exemplary data and processing engines implemented by the node of FIG. 3 when selecting between a WiFi™ network and a cellular network according to a low-battery operating mode, according to one embodiment of the present invention. In FIG. 10A, prioritization engine 820 acquires traffic constraints 802, device constraints 804, and network constraints 806, similar to above. Prioritization engine 820 also receives operating mode 1010 of node 130, which indicates that node 130 operates in a high-throughput mode to support video streaming as well as a power conservation mode due to low battery.

Based on operating mode 1010, node 130 prioritizes traffic constraints 802 and device constraints 804 to generate prioritized traffic constraints 1022 and prioritized device constraints 1024, respectively. Prioritization engine 820 also prioritizes different network constraints 806 associated with the WiFi™ network and the cellular network to generate prioritized WiFi™ constraints 1026-0 and prioritized cellular constraints 1026-1, respectively. Since node 130 operates according to power conservation mode, as well as high-throughput mode, prioritized WiFi™ constraints 1026-0 and prioritized cellular constraints 1026-1 dictate higher priorities for power related constraints, such as transmit power and power saving functions, compared to prioritized WiFi™ constraints 926-0 and prioritized cellular constraints 926-1 shown in FIG. 9A. Network selection and rating engine 840 then receives the various prioritized constraints.

In FIG. 10B, network selection and rating engine 840 computes different network ratings 1050 for the WiFi™ network and the cellular network. By comparing the different network ratings, network selection and rating engine 840 determines that the WiFi™ network is rated higher than the cellular network, indicating that the WiFi™ network may support operating mode 1010 more effectively than the cellular network. Node 130 may than route traffic across the WiFi™ network.

In one embodiment, node 130 implements a decision process whereby node 130 compares corresponding constraints associated with the WiFi™ network and the cellular network. In doing so, node 130 first determines that both networks provide good security (first priority). Node 130 then determines that both networks support power saving functions (second priority). Node 130 then determines that the transmit power of the WiFi™ network is 13 dB less than that of the cellular network, thereby affording a significant power savings compared to the cellular network and disqualifying the cellular network from consideration. Node 130 therefore selects the WiFi™ network.

Figure 11A:
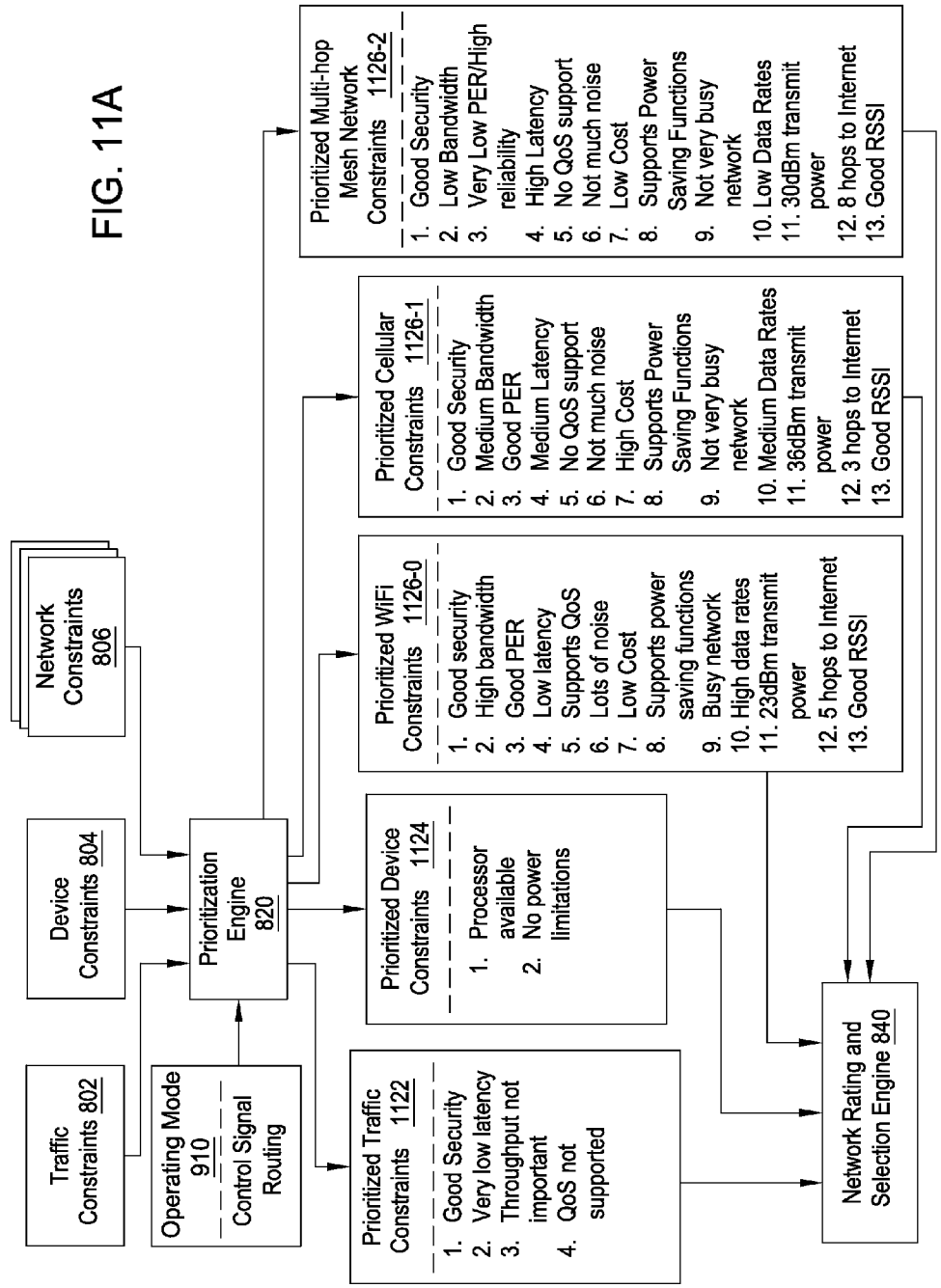
FIGS. 11A-11B illustrate exemplary data and processing engines implemented by the node of FIG. 3 when selecting between a WiFi™ network, a cellular network, and a multi-hop mesh network according to a low-latency operating mode, according to one embodiment of the present invention.
Figure 11B:
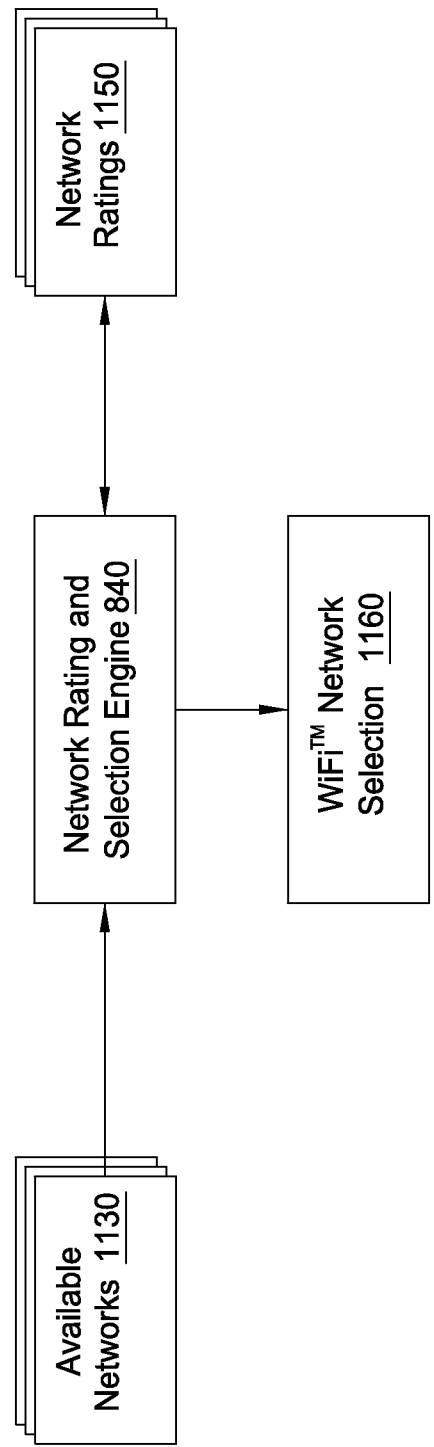

FIGS. 11A-11B illustrate exemplary data and processing engines implemented by the node of FIG. 3 when selecting between a WiFi™ network, a cellular network, and a multi-hop mesh network according to a low-latency operating mode, according to one embodiment of the present invention. In FIG. 11A, prioritization engine 820 acquires traffic constraints 802, device constraints 804, and network constraints 806, similar to above. Prioritization engine 820 also receives operating mode 1110 of node 130, which indicates that node 130 operates in a control signal routing mode.

Based on operating mode 1110, node 130 prioritizes traffic constraints 802 and device constraints 804 to generate prioritized traffic constraints 1122 and prioritized device constraints 1124, respectively. Prioritization engine 820 also prioritizes different network constraints 806 associated with the WiFi™ network, the cellular network, and the multi-hop mesh network to generate prioritized WiFi™ constraints 1126-0, prioritized cellular constraints 1126-1, and prioritized multi-hop mesh network constraints 1126-2, respectively. Network selection and rating engine 840 receives the various prioritized constraints.

In FIG. 11B, network selection and rating engine 840 computes different network ratings 1150 for the WiFi™ network, the cellular network, and the multi-hop mesh network. By comparing the different network ratings, network selection and rating engine 840 determines that the WiFi™ network is rated higher than either of the other networks, indicating that the WiFi™ network may support operating mode 1110 more effectively than the other networks. Node 130 may than route traffic across the WiFi™ network.

In one embodiment, node 130 implements a decision process whereby node 130 compares corresponding constraints associated with the various networks to which node is coupled. In doing so, node 130 first determines that all three networks provide good security (first priority). Node 130 then determines only the WiFi™ provides very low latency (fourth priority), thereby eliminating the cellular network and the multi-hop mesh network from consideration. Node 130 therefore selects the WiFi™ network.

Figure 12B:
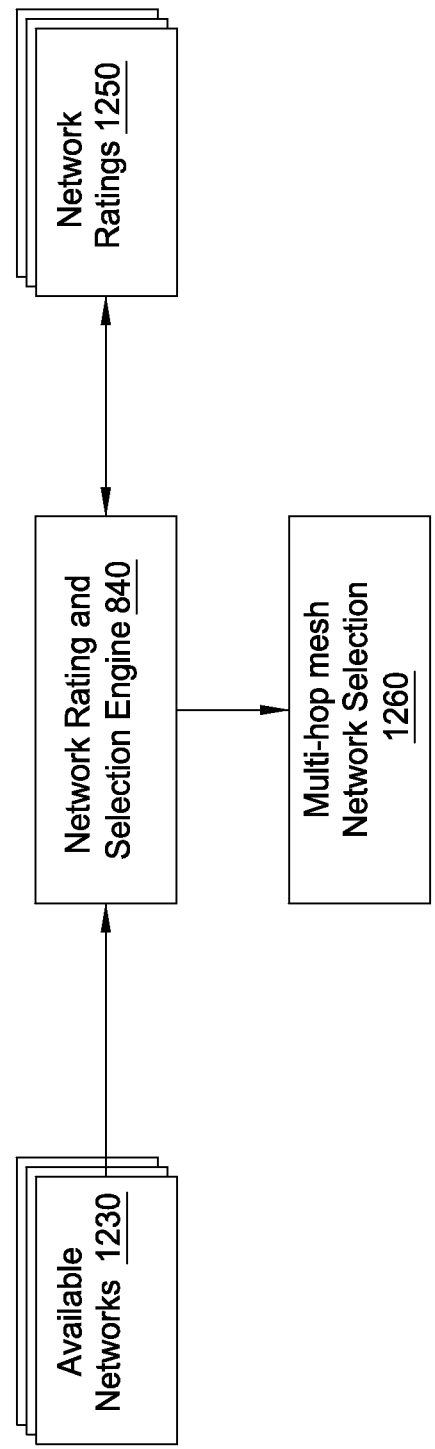

FIGS. 12A-12B illustrate exemplary data and processing engines implemented by the node of FIG. 3 when selecting between a WiFi™ network, a cellular network, and a multi-hop mesh network according to a high-reliability operating mode, according to one embodiment of the present invention. In FIG. 12A, prioritization engine 820 acquires traffic constraints 802, device constraints 804, and network constraints 806, similar to above. Prioritization engine 820 also receives operating mode 1210 of node 130, which indicates that node 130 operates in a high-reliability operating mode.

Based on operating mode 1210, node 130 prioritizes traffic constraints 802 and device constraints 804 to generate prioritized traffic constraints 1222 and prioritized device constraints 1224, respectively. Prioritization engine 820 also prioritizes different network constraints 806 associated with the WiFi™ network, the cellular network, and the multi-hop mesh network to generate prioritized WiFi™ constraints 1226-0, prioritized cellular constraints 1226-1, and prioritized multi-hop mesh network constraints 1226-2, respectively. Network selection and rating engine 840 receives the various prioritized constraints.

In FIG. 12B, network selection and rating engine 840 computes different network ratings 1250 for the WiFi™ network, the cellular network, and the multi-hop mesh network. By comparing the different network ratings, network selection and rating engine 840 determines that the multi-hop mesh network is rated higher than either of the other networks, indicating that the multi-hop mesh network may support operating mode 1210 more effectively than the other networks. Node 130 may than route traffic across the multi-hop mesh network.

In one embodiment, node 130 implements a decision process whereby node 130 compares corresponding constraints associated with the various networks to which node is coupled. In doing so, node 130 first determines that all three networks provide good security (first priority). Node 130 then determines only the multi-hop mesh network provides high reliability (third priority), thereby eliminating the WiFi™ network and the cellular network from consideration. Node 130 therefore selects the multi-hop mesh network.

In sum, a node within a wireless endpoint device may be coupled to multiple heterogeneous networks simultaneously. The node is configured to select between the different networks based on various constraints associated with the endpoint device, applications executing on the endpoint device, traffic routed by the endpoint device, and constraints associated with the multiple networks. Based on these different constraints, and based on the current operating mode of the node, the node rates each network, and then selects the network with the highest rating to be used for routing purposes.

One advantage of the techniques set forth herein is that the endpoint device may select the optimal network on which to perform communications based on a wider range of environmental and operational factors compared to traditional approaches. Accordingly, the endpoint device can be configured to maintain robust communication with other devices in many different potential use-cases.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

The invention claimed is:

1. A computer-implemented method for selecting between heterogeneous networks, the method comprising:
    acquiring a set of constraints associated with a network node;
    determining a current operating mode associated with the network node;
    prioritizing the set of constraints based on the current operating mode to generate a set of prioritized constraints;
    acquiring, via one or more receiver devices, first information associated with the set of prioritized constraints from a first network to which the network node is coupled and second information associated with the set of prioritized constraints from a second network to which the network node is coupled;
    generating a first rating for the first network based on the first information;
    generating a second rating for the second network based on the second information;
    determining that the first rating exceeds the second rating; and in response to determining that the first rating exceeds the second rating, causing the network node to transmit or receive data on the first network.

2. The computer-implemented method of claim 1, wherein the set of constraints includes one or more constraints associated with data traffic that the network node transmits or receives.

3. The computer-implemented method of claim 2, wherein the one or more constraints comprise a latency constraint associated with the data traffic, and wherein the operating mode comprises a low-latency operating mode.

4. The computer-implemented method of claim 1, wherein the network node comprises an endpoint device, and the set of constraints includes one or more constraints associated with the endpoint device.

5. The computer-implemented method of claim 4, wherein the one or more constraints comprise a power consumption constraint associated with the endpoint device, and wherein the operating mode comprises a power conservation mode.

6. The computer-implemented method of claim 1, wherein the set of constraints includes one or more constraints associated with the first network and one or more constraints associated with the second network.

7. The computer-implemented method of claim 6, wherein the one or more constraints associated with the first network comprise a first security constraint, the one or more constraints associated with the second network comprise a second security constraint, and wherein the operating mode comprises a secure operating mode.

8. The computer-implemented method of claim 6, wherein prioritizing the set of constraints comprises prioritizing the one or more constraints associated with the first network to generate one or more first prioritized network constraints, and wherein generating the first rating comprises:

weighting each constraint included in the one or more first prioritized network constraints based on an associated priority level to generate a first set of weighted constraints; and accumulating the first set of weighted constraints to generate the first rating.

9. The computer-implemented method of claim 6, wherein prioritizing the set of constraints comprises prioritizing the one or more constraints associated with the second network to generate one or more second prioritized network constraints, and wherein generating the second rating comprises:

weighting each constraint included in the one or more second prioritized network constraints based on an associated priority level to generate a second set of weighted constraints; and accumulating the second set of weighted constraints to generate the first rating.

10. The computer-implemented method of claim 1, wherein the one or more receiver devices comprise a wireless receiver.

11. A non-transitory computer-readable medium storing program instructions that, when executed by a processing unit within a network node, cause the processing unit to select between heterogeneous networks, by performing the steps of:

prioritizing a set of constraints associated with the network node based on a current operating mode associated with the network node;

acquiring, via one or more receiver devices, first information associated with the set of constraints from a first network to which the network node is coupled and second information associated with the set of constraints from a second network to which the network node is coupled;

generating a first rating for the first network based on the first information;

generating a second rating for the second network based on the second information;

determining that the first rating exceeds the second rating; and in response to determining that the first rating exceeds the second rating, causing the network node to transmit or receive data on the first network.

12. The non-transitory computer-readable medium of claim 11, wherein the set of constraints includes one or more constraints associated with data traffic that the network node transmits or receives.

13. The non-transitory computer-readable medium of claim 12, wherein the one or more constraints comprise a latency constraint associated with the data traffic, and wherein the operating mode comprises a low-latency operating mode.

14. The non-transitory computer-readable medium of claim 11, wherein the network node comprises an endpoint device, and the set of constraints includes one or more constraints associated with the endpoint device.

15. The non-transitory computer-readable medium of claim 14, wherein the one or more constraints comprise a power consumption constraint associated with the endpoint device, and wherein the operating mode comprises a power conservation mode.

16. The non-transitory computer-readable medium of claim 11, wherein the set of constraints includes one or more constraints associated with the first network and one or more constraints associated with the second network.

17. The non-transitory computer-readable medium of claim 16, wherein the one or more constraints associated with the first network comprise a first security constraint, the one or more constraints associated with the second network comprise a second security constraint, and wherein the operating mode comprises a secure operating mode.

18. The non-transitory computer-readable medium of claim 16, wherein prioritizing the set of constraints comprises prioritizing the one or more constraints associated with the first network to generate one or more first prioritized network constraints, and wherein generating the first rating comprises:

weighting each constraint included in the one or more first prioritized network constraints based on an associated priority level to generate a first set of weighted constraints; and accumulating the first set of weighted constraints to generate the first rating.

19. The non-transitory computer-readable medium of claim 16, wherein prioritizing the set of constraints comprises prioritizing the one or more constraints associated with the second network to generate one or more second prioritized network constraints, and wherein generating the second rating comprises:

weighting each constraint included in the one or more second prioritized network constraints based on an associated priority level to generate a second set of weighted constraints; and accumulating the second set of weighted constraints to generate the first rating.

20. A system for selecting between heterogeneous networks, comprising:

a memory unit storing program code comprising a software application;

a processing unit coupled to the memory unit and configured to execute the program code; and a network node coupled to the processing unit and coupled to the heterogeneous networks and configured to route traffic associated with the software application across the heterogeneous networks by:

acquiring a set of constraints associated with the network node, determining a current operating mode associated with the network node, prioritizing the set of constraints based on the current operating mode to generate a set of prioritized constraints, acquiring, via one or more receiver devices, first information associated with a first subset of the set of prioritized constraints from a first network included within the heterogeneous networks and second information associated with a second subset of the set of prioritized constraints from a second network included within the heterogeneous networks, determining that first traffic associated with the software application should be routed on the first network based on the first information, and determining that second traffic associated with the software application should be routed on the second network based on the second information, and routing the first traffic and the second traffic.

21. The system of claim 20, wherein the first subset includes one or more traffic constraints associated with the first traffic and one or more network constraints associated with the first network, wherein the second subset includes one or more traffic constraints associated with the second traffic and one or more network constraints associated with the second network, and wherein the operating mode comprises a multi-network mode.

* * * * *

UNITED STATES PATENT AND TRADEMARK OFFICE
CERTIFICATE OF CORRECTION

PATENT NO. : 9,722,814 B2
APPLICATION NO. : 14/271035
DATED : August 1, 2017
INVENTOR(S) : Dalton Victor, Elad Gottlib and George H. Flammer, III It is certified that error appears in the above-identified patent and that said Letters Patent is hereby corrected as shown below:

On the Title Page

(73) Assignee:
Please delete "Silver Springs Networks, Inc." and insert --Silver Spring Networks, Inc.--.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*